United States Patent
Tubbs et al.

(10) Patent No.: US 10,133,300 B2
(45) Date of Patent: Nov. 20, 2018

(54) CONTROL OF PREDICATION ACROSS CLOCK DOMAINS

(71) Applicant: MICROSOFT TECHNOLOGY LICENSING, LLC, Redmond, WA (US)

(72) Inventors: Matthew Ray Tubbs, Redmond, WA (US); Robert Allen Shearer, Woodinville, WA (US); Ryan Haraden, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 339 days.

(21) Appl. No.: 14/150,554

(22) Filed: Jan. 8, 2014

(65) Prior Publication Data

US 2015/0192950 A1    Jul. 9, 2015

(51) Int. Cl.
| | |
|---|---|
| *G06F 1/12* | (2006.01) |
| *G06F 9/30* | (2018.01) |
| *G06F 9/38* | (2018.01) |
| *G06F 15/173* | (2006.01) |

(52) U.S. Cl.
CPC ............ *G06F 1/12* (2013.01); *G06F 9/30072* (2013.01); *G06F 9/30145* (2013.01); *G06F 9/3869* (2013.01); *G06F 9/30058* (2013.01); *G06F 9/3842* (2013.01); *G06F 15/17325* (2013.01)

(58) Field of Classification Search
CPC ...... G06F 1/12; G06F 9/3869; G06F 9/30072; G06F 9/30145; G06F 9/30058; G06F 9/3842; G06F 15/17325
USPC .................. 713/400, 401; 712/233, 234, 235
See application file for complete search history.

(56) References Cited

U.S. PATENT DOCUMENTS

| | | | |
|---|---|---|---|
| 5,041,969 A | 8/1991 | Kawasaki et al. | |
| 5,426,742 A | 6/1995 | Kawasaki et al. | |
| 5,495,598 A | 2/1996 | Byers et al. | |
| 5,794,025 A | 8/1998 | Bergantino et al. | |
| 6,910,123 B1 * | 6/2005 | Bosshart ............. | G06F 9/30072 712/226 |
| 7,234,043 B2 * | 6/2007 | Blasco Allue ...... | G06F 9/30072 712/226 |

(Continued)

OTHER PUBLICATIONS

"Branch Predication", Wikipedia, http://en.wikipedia.org/wiki/Branch_predication, Accessed Sep. 11, 2013, 3 pages.

(Continued)

*Primary Examiner* — Ji H Bae
(74) *Attorney, Agent, or Firm* — Alleman Hall Creasman & Tuttle LLP

(57) ABSTRACT

Embodiments are disclosed for a method of executing instructions in a processing core of a microprocessor. In one embodiment, the method comprises, in a first clock domain, receiving an input from a second clock domain external to the first clock domain, the input comprising an indication from the second clock domain regarding whether to execute an instruction in the first clock domain. The method further comprises synchronizing the input from the second clock domain with the first clock domain, if the instruction is a predicatable instruction and the indication matches a predicate condition that indicates not to perform the instruction, then not performing the instruction, and otherwise performing the instruction.

13 Claims, 5 Drawing Sheets

(56) References Cited

U.S. PATENT DOCUMENTS

| | | |
|---|---|---|
| 2002/0087847 A1 | 7/2002 | Kling et al. |
| 2004/0123082 A1 | 6/2004 | Benjamin et al. |
| 2009/0055635 A1 | 2/2009 | Tani |
| 2013/0159674 A1 | 6/2013 | Muff et al. |
| 2013/0159675 A1* | 6/2013 | Muff .................. G06F 9/30072 712/208 |
| 2013/0159683 A1 | 6/2013 | Hickey et al. |

OTHER PUBLICATIONS

"Spinlock", Wikipedia, http://en.wikipedia.org/wiki/Spinlock, Accessed Sep. 11, 2013, 3 pages.

"Interrupt", Wikipedia, http://en.wikipedia.org/wiki/Interrupt, Accessed Sep. 11, 2013, 7 pages.

ISA European Patent Office, International Search Report and Written Opinion issued in PCT/US2014/071329, dated Apr. 20, 2015, Netherlands, 16 Pages.

* cited by examiner

CONTROL OF PREDICATION ACROSS CLOCK DOMAINS

BACKGROUND

Some computer programs may be implemented with conditional branch instructions, wherein different conditions may lead to the execution of different code. Branch prediction may be used to help predict which branch may be utilized, but where a branch instruction is predicted incorrectly, the computing cost may be high due to having to clear the processing pipeline.

In light of the high costs of incorrect branch prediction, some devices may utilize branch predication. Branch predication involves the use of predicated instructions that allow branched instructions to be provided sequentially to a processor, and allows instructions to be skipped when a predicate condition is not met.

SUMMARY

Embodiments are disclosed for controlling the predication of instructions in a first clock domain with external input from a second clock domain. For example, one disclosed embodiment provides a method of executing instructions in a processing core of a microprocessor. The method comprises, in a first clock domain, receiving an input from a second clock domain external to the first clock domain, the input comprising an indication from the second clock domain regarding whether to execute an instruction in the first clock domain. The method further comprises synchronizing the input from the second clock domain with the first clock domain. If the instruction is a predicatable instruction and the indication matches a predicate condition that indicates not to perform the instruction, then the method comprises not performing the instruction, while otherwise the method comprises performing the instruction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
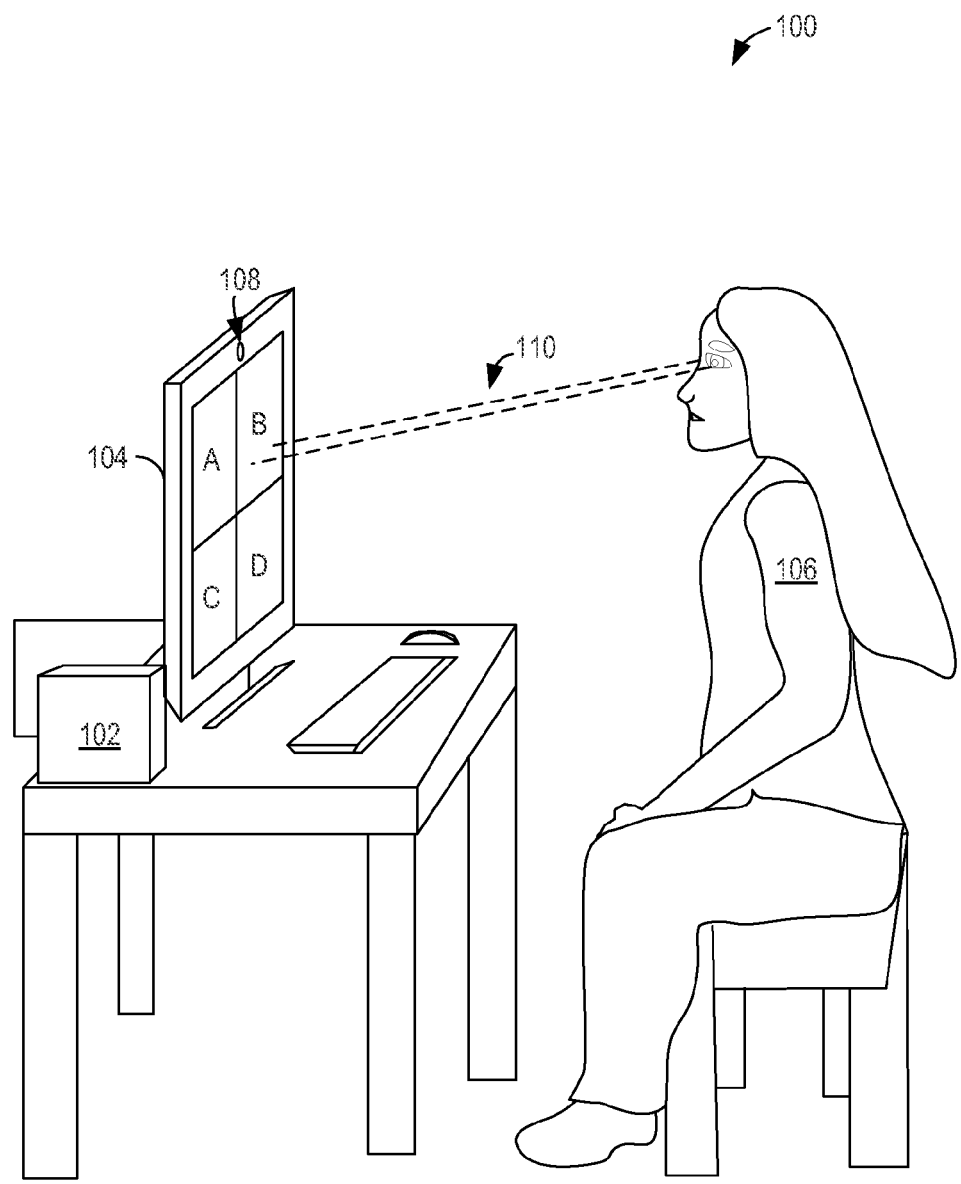
FIG. 1 shows a computing environment in accordance with one or more embodiments of the present disclosure.

FIG. 1 shows a computing environment 100 including a computing device 102. The computing device 102 may be communicatively connected to a display device 104 for displaying information, such as a user interface, to a user 106. Although a desktop computing system is illustrated in FIG. 1, it is to be understood that the computing device 102 may take any suitable form, such as a gaming system, a mobile computing device, a home entertainment device, etc. In some embodiments, the display device 104 may be integrated into the computing device 102 to form a computing system such as a smart phone, a tablet computer, a laptop, a mobile gaming device, etc. The computing device 102 may have any suitable architecture, including one or more central processing units (CPUs) with one or more processing cores. In some embodiments, the computing device 102 may include one or more graphics processing units (GPUs) having one or more processing cores configured to perform operations associated with rendering images for display on a display device, such as display device 104.

The computing device 102 may be communicatively connected to a camera 108, which may be integrated into the display device 104 and/or included in a separate housing to the display device 104. The camera 108 may include one or more visible light cameras, infrared light cameras, depth cameras (e.g., time-of-flight and/or structured light imaging devices), etc. The camera 108 may be configured to image an environment, including the user 106. In some embodiments, the camera 108 may be configured to determine a gaze 110 of the user 106 in order to identify a portion of a screen of the display device 104 to which the attention of the user 106 is directed. In this way, the computing device 102 may not only be aware of portions of the screen to which the gaze 110 of the user 106 is directed, but also of portions of the screen to which the gaze 110 of the user 106 is not directed.

As the CPU and/or GPU of the computing device 102 may execute instructions for performing resource-intensive tasks related to rendering an image on the display device 104 (e.g., anti-aliasing, texture-mapping, other matrix and/or vector operations, etc.), overall performance may be increased if such tasks were selectively performed. For example, rendering speed may be increased if some resource-intensive tasks were selectively performed for regions of a displayable image that are being viewed by the user (e.g., regions to which the gaze of the user is directed). In the illustrated example of FIG. 1, the gaze 110 of the user 106 is directed to a portion of an image displayed on the displayed device in the region designated with the letter "B." Based on the indication from the camera 108, as processed by the CPU and/or a particular core of the CPU, at least some instructions that are executed in the GPU and/or a different core of the CPU that control the rendering of the displayable image may be skipped when rendering portions of the image in, for example, regions "A," "C," and/or "D." Although the image in these regions may be displayed with a lower quality (e.g., lower resolution, increased aliasing, higher number of artifacts, increased compression, etc.) compared to region "B," such a loss in quality may go unnoticed while the gaze 110 of the user 106 is directed elsewhere.

Although illustrated as being divided into four regions, it is to be understood that the determination of which portion of the displayable image to render with a higher quality may be performed in any suitable manner. For example, the displayable image may be divided into any number of regions, each region having any suitable number of pixels and/or any suitable shape. In some embodiments, a particular set of instructions for performing a particular rendering task(s) may be selectively skipped based on the gaze of the user. In other embodiments, different sets of instructions for performing different rendering tasks may be selectively skipped, such that a level of quality of a portion of an image may gradually decrease based on the proximity of that portion to the gaze of the user.

In the above-described scenario, the eye detection processor and/or processing core (e.g., that executes instructions for eye detection and for determining the gaze 110 of the user 106) communicates to the rendering processor and/or processing core (e.g., that executes instructions for rendering an image) the location on the screen to which the user is gazing. In some systems, such communication may be performed through a coherent, shared memory or register, and the conditional computation on the rendering processor may be implemented with compare and branch instructions. However, microprocessor performance may be hampered when branch instructions are not predicted correctly.

One method used to reduce branch mis-predict penalties is to use predication if the architecture supports predication. Predication may be implemented, for example, in a microprocessor by having an architected predicate register that can be written by move-to type instructions or compare instructions. Instructions later in the program flow then have immediate fields in the instruction that point to a specific bit in the predicate register. If that bit is set, then the instruction is not executed, and flows down the instruction pipeline like a "no-op" instead of the entire pipeline being flushed, as would be the case with a branch mis-predict. However, since the predicate register is part of the architected state of the microprocessor, if some external source will be utilized to alter the predicate register (e.g., from an external input or another microprocessor core or thread, such as the detection processor), the arrangement may rely on using shared memory, atomic operations, spin-locks, and/or external interrupts to operate correctly, all of which may have negative performance implications.

Figure 2:
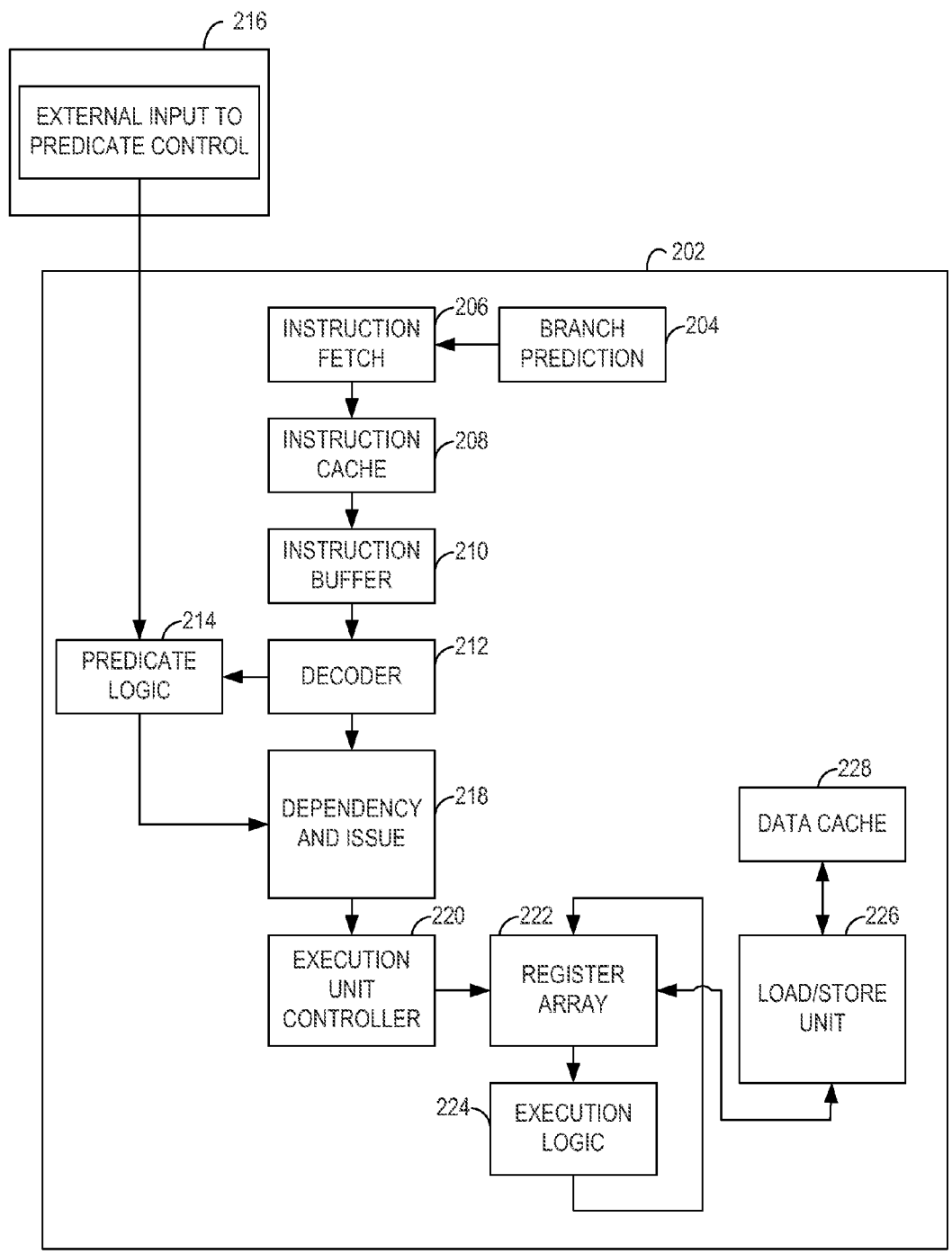
FIG. 2 shows a block diagram of an example processing core in accordance with one or more embodiments of the present disclosure.

In order to provide fast predication of instructions from sources external to the microprocessor core without the need for spinlocks or an interrupt, the computing device of the present disclosure may utilize predicate logic described in more detail with respect to FIGS. 3 and 4 below. Before addressing this predicate logic, a block diagram illustrating the architecture of an example processing core 202 is shown in FIG. 2.

The processing core 202 may represent an example of a processing core of the computing device 102 of FIG. 1, such as a processing core of a central processing unit (e.g., a multi-core processor) and/or a processing core of a graphics processing unit of the computing device. Although elements related to a processing pipeline within the processing core 202 are illustrated, it is to be understood that additional or alternative elements may be included in the processing core. Additionally, two or more of the depicted elements may be included in a single component and/or communicatively coupled with one another.

The processing core 202 includes a branch prediction unit 204, which works with an instruction fetch unit 206 to fetch a requested instruction from instruction cache 208. For example, branch prediction unit 204 may instruct the instruction fetch unit 206 to fetch a particular instruction in a sequence of instructions of a computer program once that instruction is reached. An instruction buffer 210 may temporarily store the fetched instruction (e.g., until a previous instruction has progressed down the processing pipeline) and provide the instruction to a decoder 212. As the instruction may include portions that are relevant to different areas of the processing unit, the decoder 212 may separate the instruction into different portions to determine which operation is to be performed for that instruction (e.g., which action is associated with the instruction) and information for performing that operation. The decoder 212 may additionally determine whether the instruction is a type of instruction that is able to be predicated (e.g., based on decoding the instruction). Responsive to the determination, the decoder 212 may send an indication to a predicate logic unit 214 indicating whether the instruction is able to be predicated. For example, the decoder 212 may send a logical 1 to the predicate logic unit 214 if the instruction is able to be predicated and a logical 0 if the instruction is not able to be predicated.

The predicate logic unit 214 may also receive a signal from an external input source 216 in a different clock domain from the processing core 202, such as a different processing core and/or a different microprocessor. For example, the predicate logic unit 214 may receive a signal from a processing core that is detecting a gaze of a user and determining a location of an image on a display device to which the user's gaze is directed, while the predicate logic unit 214 may be included in a processing core that is rendering the image for display on the display device. The decoder 212 sends the decoded instruction to the dependency and issue block 218.

The dependency and issue block 218 determines if a next instruction in the processing pipeline is going to use a result of the current instruction in the processing pipeline. Responsive to this determination, the dependency and issue block 218 may stall the next instruction for a number of processing cycles. The dependency and issue block 218 receives an indication of whether or not the current instruction is predicated off or on, which is utilized in the determination of whether to stall the next instruction. If the current instruction is predicated off, the instruction may be viewed as invalid and not performed, therefore the instruction causes no stall and no read/write requests. Otherwise, the current instruction may be viewed as valid and performed, potentially causing a stall and/or a read/write request. The dependency and issue block 218 may pass along the instruction and the indication of whether to predicate the instruction to an execution unit controller 220 to prepare the instruction for execution.

The execution unit controller 220 may temporarily store the result of a current instruction in the register array 222 if the result of the current instruction will be used for a next instruction. The execution logic unit 224 performs the operation indicated by the instruction (e.g., indicated by a decoded opcode for the instruction), and may access the register array 222 for the result of the previous instruction if the current instruction relies upon the result. The execution logic unit 224 and/or the register array 222 may utilize a load/store unit 226 to access/store information in the data cache 228 for performing the operation associated with the instruction executed by the execution logic unit 224. As described above, if the instruction is predicated off (e.g., is not to be performed), the execution logic interprets the instruction as a no-op and does not perform the operation indicated by the decoded instruction.

Providing clock domain crossing logic, for example, by gating a corresponding signal with an instruction valid signal coming out of the core's instruction decode unit with the predicate logic unit, as described in more detail below, may help to ensure that the incoming signal from the different clock domain does not cause metastability. Subsequently, when an instruction to be predicated proceeds down the pipeline to the dependency and issue block 218, and eventually to the execution logic unit 224, the associated instruction valid will be off, the dependency unit will cause no stalls, and the execution unit will not make any changes to architected state in the register file, effectively treating the instruction like a no-op.

Figure 3:
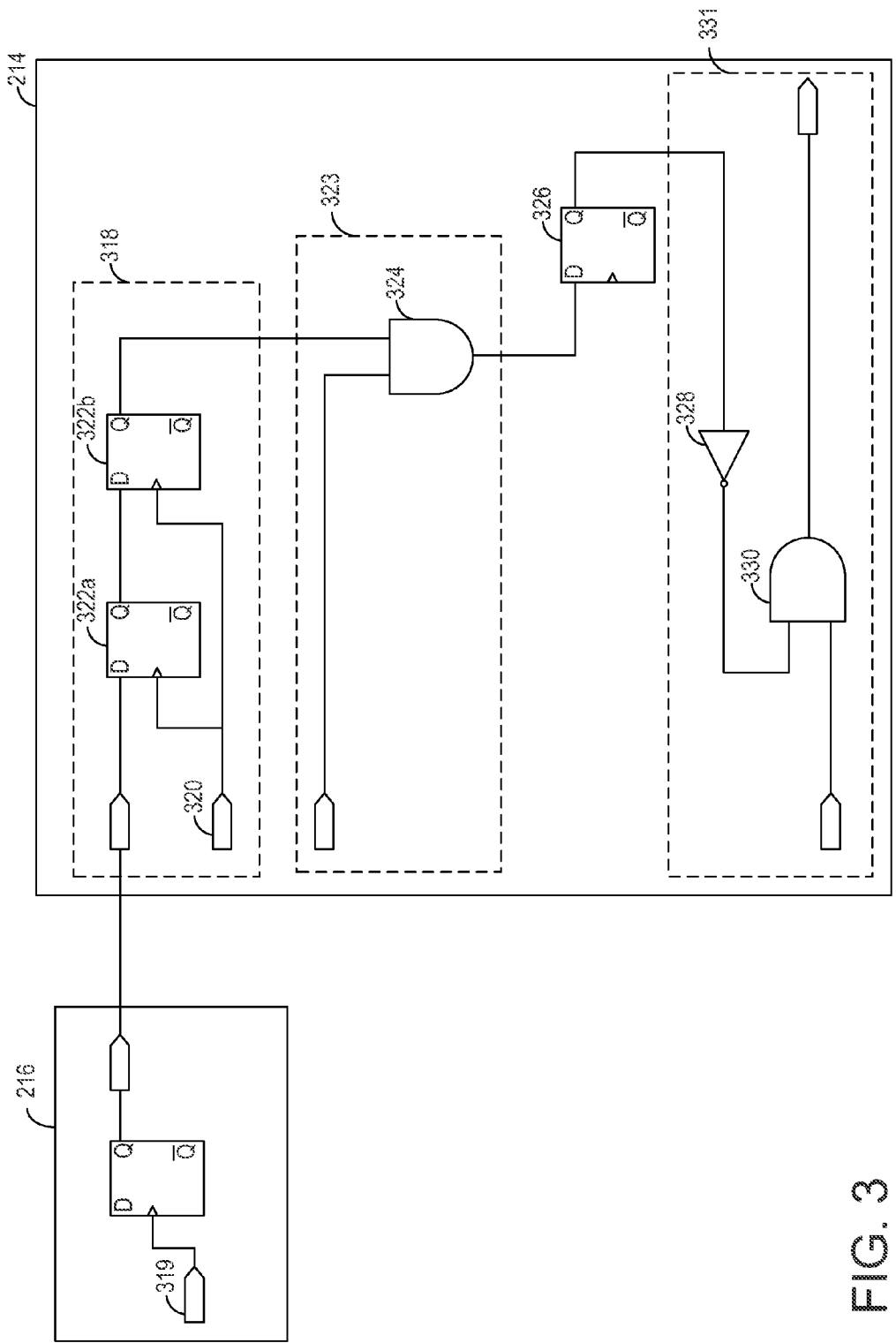
FIG. 3 schematically shows an example configuration of a predicate logic unit in accordance with one or more embodiments of the present disclosure.

FIG. 3 illustrates a circuit diagram representing an example configuration of the predicate logic unit 214 of FIG. 2. The predicate logic unit 214 includes a clock domain crossing block 318 in a first clock domain configured to receive input from an external signal source 216 having a second clock 319, the input including an indication of whether an instruction is to be executed. For example, the output from the external signal source 216 may be a logical 1 when the instruction is not to be executed and a logical 0 when the instruction is to be executed. The clock domain crossing block 318 may synchronize the second clock 319 with a first clock 320 local to the processing core, and output a synchronized indication from the second clock domain regarding whether to execute the instruction in the first clock domain. While the depicted external signal source comprises a d-type flip flop, it will be understood that this signal source is presented for the purpose of example, and that the external signal source may comprise any suitable signal source.

In the example illustrated in FIG. 3, the clock domain crossing block 318 includes a first D flip flop 322a and a second D flip flop 322b connected in sequence and receiving a clock signal from the first clock 320 in order to synchronize the timing of the indication from the external signal source 216 with the first clock 320 so that the indication is aligned with the timing for performing the associated instruction in the second clock. Although illustrated as including two D flip flops in FIG. 3, it is to be understood that any suitable components may be utilized in the clock domain crossing block 318 to synchronize the timing of the indicator from the external signal source 216 with the first clock 320.

The output of the clock domain crossing block 318 may be the same logical value as the indication from the external signal source 216. Thus, the output of the clock domain crossing block 318 may be provided as an input to a predication verification block 323, which includes a first logical AND gate 324. The other input to the first logical AND gate 324 may receiver an input from a decoder (e.g., decoder 212 of FIG. 2) indicating whether the instruction is a type that is able to be predicated. For example, the indication from the decoder may be a logical 1 if the instruction is able to be predicated and a logical 0 if the instruction is not able to be predicated. Accordingly, the output of the first logical AND gate 324 may be a logical 1 if the instruction is able to be predicated and matches a predicate condition that indicates not to perform the instruction (e.g., based on the signal from the external signal source 216). Otherwise, if either the instruction is not able to be predicated and/or the instruction does not match a predicate condition that indicates not to perform the instruction (e.g., based on the signal from the external signal source 216), the output of the AND gate 324 may be a logical 0.

The output of the first logical AND gate 324 may be provided to a D flip flop 326 and then passed to an inverter 328 to invert the output of the logical AND gate 324. The output of the inverter 328 may be provided as an input to a second logical AND gate 330 as part of an instruction verification block 331, which may receive as a second input an indication from a decoder (e.g., decoder 212 of FIG. 2) indicating whether the instruction is a valid instruction. For example, the second input may be a logical 1 when the instruction is a valid instruction and a logical 0 when the instruction is not a valid instruction. Examples of invalid instructions may include instructions that are present while an instruction pipeline is stalled (e.g., while waiting for another instruction to complete), an instruction including an illegal opcode (e.g., the bits making up the opcode of the instruction are of a permutation that is not defined in the architecture), etc. Accordingly, the second logical AND gate 330 may output a logical 1 when the instruction is a valid instruction and the instruction is either not able to be predicated and/or is indicated to be executed based on the signal from the external signal source 216. The AND gate 330 may output a logical 0 when the instruction is not a valid instruction and/or the instruction is both able to be predicated and indicated to be skipped based on the signal from the external signal source 216. The output of the second logical AND gate 330 may be provided to a dependency and issue block (e.g., dependency and issue block 218 of FIG. 2) to control the selective execution of the instruction.

Figure 4:
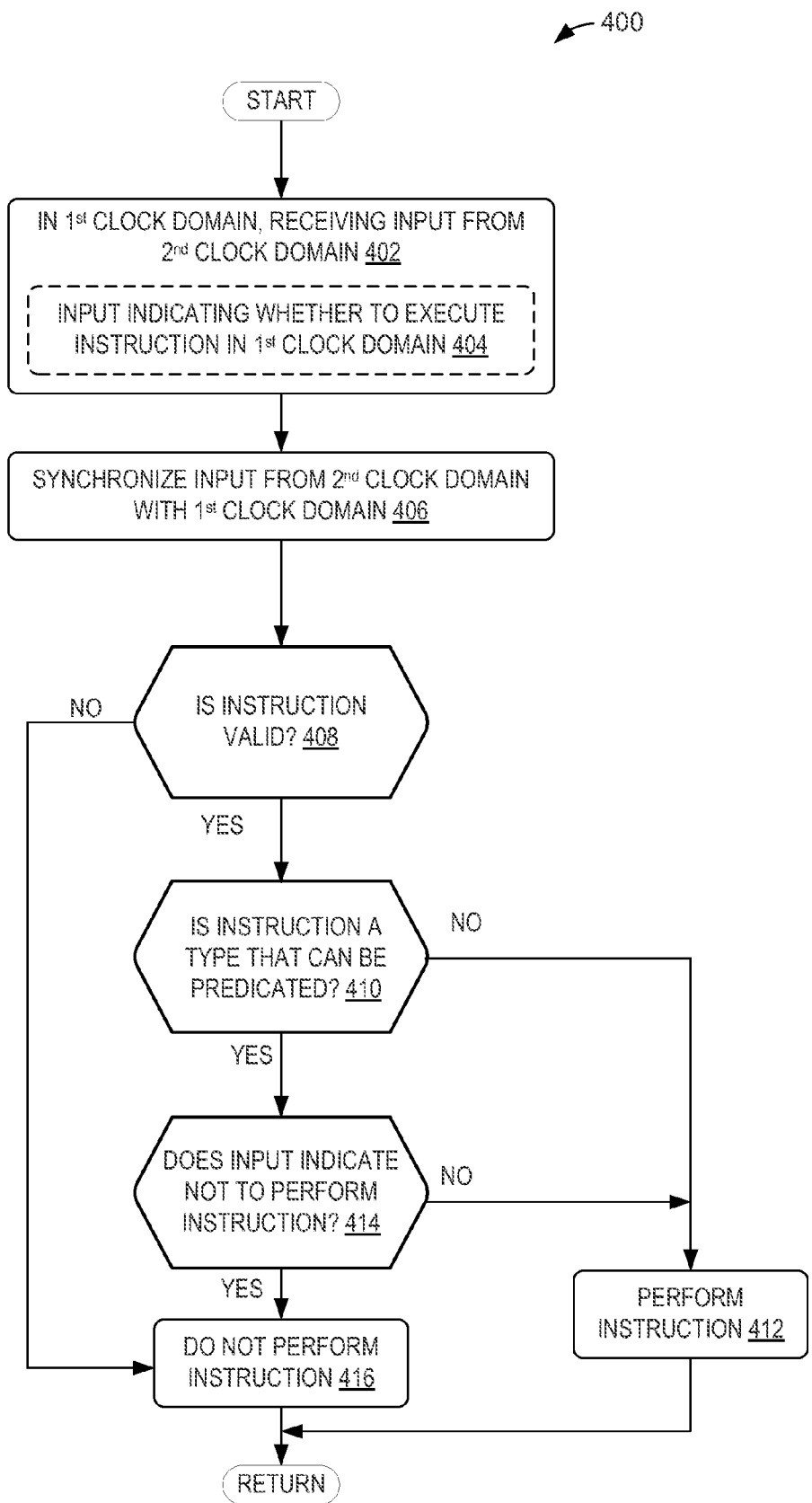
FIG. 4 is a flow chart depicting a method of selectively executing instructions in a processing core in accordance with one or more embodiments of the present disclosure.

FIG. 4 is a flow chart of a method 400 of selectively executing instructions in a processing core of a microprocessor or other suitable device. At 402, the method 400 includes, in a first clock domain, receiving an input originating from a second clock domain. The input may indicate whether to execute an instruction in the first clock domain, as indicated at 404. The method 400 includes synchronizing the input from the second clock domain with the first clock domain at 406. For example, the clock domain crossing block 318 of FIG. 3 may synchronize input from external signal source 216 with the first clock 320.

The method proceeds to 408 to determine whether the instruction is valid. If the instruction is valid (e.g., "YES" at 408), the method proceeds to 410 to determine if the instruction is a type that can be predicated. Conversely, if the instruction is invalid (e.g., "NO" at 408), the method proceeds to 416 to not perform the instruction (e.g., to discard or ignore the instruction). At 410, the method 400 includes determining if the instruction is a type that can be predicated (e.g., if the instruction is predicatable). For example, the determination of the type of instruction may be performed by a decoder, such as decoder 212 of FIG. 2. If the instruction is not able to be predicated (e.g., "NO" at 410), the method 400 proceeds to 412 to perform the instruction. Conversely, if the instruction is able to be predicated (e.g., "YES" at 410), the method 400 proceeds to 414 to determine whether the input from the second clock domain indicates not to perform the instruction. If the input indicates that the instruction should be performed (e.g. "NO" at 414), the method 400 proceeds to 412 to perform the instruction. Conversely, if the input indicates that the instruction should not be performed (e.g., "YES" at 414), the method 400 proceeds to 416 to not perform the instruction (e.g., to discard or ignore the instruction).

The above-described predicate logic may enable cross-domain control over predicating instructions without the use of slower, more resource-intensive methods, such as using shared memory, atomic operations, spin-locks, and/or external interrupts, all of which may have negative performance implications. Although examples of processing pipelines, associated processor elements, and predicate logic configurations are illustrated and discussed above, it is to be understood that other methods and architectures may be utilized to achieve the cross-domain control described herein. For example, different architectures and methods from those presented above may be utilized for synchronizing clock domains, gating signals to/within the predicate logic, and otherwise selectively executing instructions.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
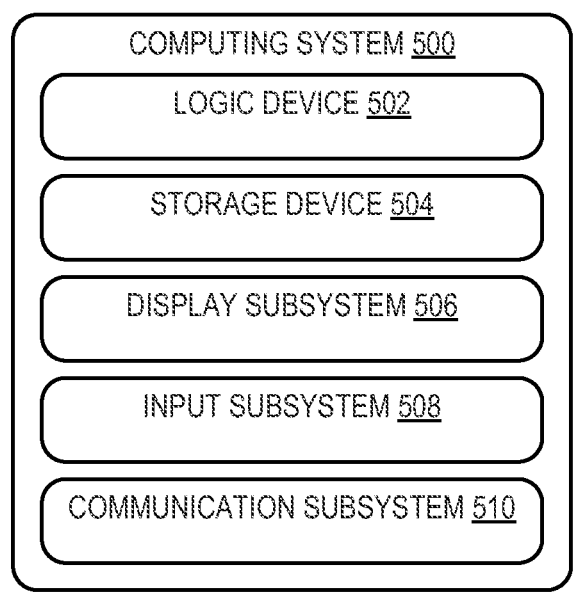
FIG. 5 is a block diagram of an example computing device in accordance with one or more embodiments of the present disclosure.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices. For example, computing system 500 may include computing device 102 of FIG. 1.

Computing system 500 includes a logic device 502 and a storage device 504. Computing system 500 may optionally include a display subsystem 506, input subsystem 508, communication subsystem 510, and/or other components not shown in FIG. 5.

Logic device 502 includes one or more physical devices configured to execute instructions. For example, the logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. For example, logic device 502 may include processing core 202 and/or external signal source 216. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 504 includes one or more physical devices configured to hold instructions executable by the logic device to implement the methods and processes described herein. When such methods and processes are implemented, the state of storage device 504 may be transformed—e.g., to hold different data.

Storage device 504 may include removable and/or built-in devices. Storage device 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 504 may include volatile, nonvolatile, dynamic, static, read/write, read-only, random-access, sequential-access, location-addressable, file-addressable, and/or content-addressable devices.

It will be appreciated that storage device 504 includes one or more physical devices. However, aspects of the instructions described herein alternatively may be propagated by a communication medium (e.g., an electromagnetic signal, an optical signal, etc.), as opposed to being stored in a storage medium of a storage device.

Aspects of logic device 502 and storage device 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 500 implemented to perform a particular function. In some cases, a program may be instantiated via logic device 502 executing machine-readable instructions held by storage device 504. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 506 may be used to present a visual representation of data held by storage device 504. This visual representation may take the form of a graphical user interface (GUI). As the herein described methods and processes change the data held by the storage device, and thus transform the state of the storage device, the state of display subsystem 506 may likewise be transformed to visually represent changes in the underlying data. Display subsystem 506 may include one or more display devices utilizing virtually any type of technology. Such display devices may be combined with logic device 502 and/or storage device 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of executing instructions in a processing core of a microprocessor, the method comprising:
    in a first clock domain, receiving an input from a signal source in a second clock domain external to the first clock domain, the input comprising an indication from the second clock domain of a condition that determines whether an instruction is executed in the first clock domain;
    synchronizing the input from the signal source in the second clock domain with the first clock domain;
    if the instruction is determined to be an invalid instruction, then not performing the instruction;
    if the instruction is a predicatable instruction and the indication matches a predicate condition that indicates not to perform the instruction, then not performing the instruction; and
    otherwise performing the instruction.

2. The method of claim 1, wherein determining if the instruction is a predicatable instruction is further based upon a signal from a decoder of the processing core indicating whether the instruction is able to be predicated.

3. The method of claim 1, wherein the processing core of the microprocessor is a first processing core of the microprocessor and the signal source in the second clock domain external to the first clock domain is a second processing core of the microprocessor.

4. The method of claim 1, wherein the microprocessor is a first microprocessor of a computing device and the signal source in the second clock domain external to the first clock domain is a second microprocessor of the computing device.

5. The method of claim 4, wherein the first microprocessor is a graphics processing unit and the second microprocessor is a central processing unit.

6. The method of claim 1, wherein not performing the instruction includes turning an instruction valid indicator for the instruction off, the instruction valid indicator causing an execution unit controller of the processing core to interpret the instruction as a no-op.

7. A processor comprising:
    a clock domain crossing block in a first clock domain the clock domain crossing block including two or more flip flops, and configured to receive input from an external signal source in a second clock domain, synchronize the input with the first clock domain, and output a synchronized indication in the first clock domain that determines whether an instruction is executed in the first clock domain, the input being based at least on a result of processing performed in the second clock domain;
    a predication verification block comprising a first logical AND gate configured to receive input from the clock domain crossing block comprising the synchronized indication and from a decoder comprising a decoded indication regarding whether the instruction is of a type that is able to be predicated; and
    an instruction verification block comprising a second logical AND gate configured to receive input including an inverted output of the first logical AND gate and output from the decoder comprising a validation indication regarding whether the instruction is a valid instruction, the instruction verification block configured to output a signal configured to indicate whether the instruction is to be executed based on the output of the second logical AND gate.

8. The processor of claim 7, wherein the clock domain crossing block includes a first D flip flop, configured to receive the input from the external signal source and a clock signal from the first clock domain, and a second D flip flop, configured to receive an output of the first D flip flop and the clock signal from the first clock domain.

9. The processor of claim 7, wherein the output of the first logical AND gate is directed to an input of a D flip flop prior to being directed to an inverter, the inverter forming the inverted output of the first logical AND gate.

10. The processor of claim 7, wherein the processor comprises a processing core of a central processing unit and the external signal source includes a processing core of a graphics processing unit.

11. The processor of claim 7, wherein the processor comprises a first processing core of a central processing unit and the external signal source includes a second processing core of the central processing unit.

12. The processor of claim 7, wherein the output of the first logical AND gate is a logical 1 if the instruction is able to be predicated and the synchronized indication represents a condition indicating not to execute the instruction in the first clock domain.

13. The processor of claim 12, wherein the output of the second logical AND gate is a logical 0 if the instruction is invalid or if the instruction is able to be predicated and the synchronized indication represents a condition indicating not to execute the instruction in the first clock domain.

* * * * *